(12) United States Patent
Gans et al.

(10) Patent No.: US 12,260,733 B2
(45) Date of Patent: *Mar. 25, 2025

(54) UNIVERSAL CONFIGURATION, CONTROL AND MONITORING OF DISPARATE DEVICES VIA AN SAAS INTERFACE AND MOBILE APPLICATION

(71) Applicant: Observables, Inc., Santa Barbara, CA (US)

(72) Inventors: Ronald R. Gans, Santa Barbara, CA (US); Abraham M. Schryer, Santa Ynez, CA (US)

(73) Assignee: Observables, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,375

(22) Filed: Mar. 4, 2024

(65) Prior Publication Data

US 2024/0203229 A1 Jun. 20, 2024

Related U.S. Application Data

(63) Continuation of application No. 17/494,674, filed on Oct. 5, 2021, now Pat. No. 11,922,790, which is a (Continued)

(51) Int. Cl.
*G08B 21/18* (2006.01)
*H04L 41/0803* (2022.01)

(52) U.S. Cl.
CPC ........ *G08B 21/182* (2013.01); *H04L 41/0803* (2013.01)

(58) Field of Classification Search
CPC .................. G98B 21/182; H04L 41/0803
See application file for complete search history.

(56) References Cited

U.S. PATENT DOCUMENTS

| 9,094,299 B1 | 7/2015 | Rao D.S. et al. |
| 10,181,988 B1 | 1/2019 | Farah |

(Continued)

OTHER PUBLICATIONS

"The Authoritative Dictionary of IEEE Standards Terms", Journal, Seventh Edition, last downloaded Sep. 5, 2019, 9 total pages.

*Primary Examiner* — Glenton B Burgess
*Assistant Examiner* — Jihad K Boustany
(74) *Attorney, Agent, or Firm* — SoCal IP Law Group LLP; Mark Andrew Goldstein

(57) ABSTRACT

A monitoring, control and configuration system that includes a local system, a mobile device application, and a server that is accessible by users via the mobile device application and a Software as a Service (SaaS) interface via a browser is disclosed. The local system contains a microprocessor, communications components and related software all of which enable communications with the server and external components coupled with the local system. The local system software and server software combine with the mobile application and website interface to enable a user to monitor, configure, and control external devices coupled with the local system and the local system itself via the server. The system replaces multiple disparate control devices with a single, configurable device and system. The system integrates multiple disparate devices and systems from multiple manufacturers. The system provides emergency alerts based on examination of information from external devices provided to the local system and the server.

12 Claims, 4 Drawing Sheets

Related U.S. Application Data continuation-in-part of application No. 15/488,128, filed on Apr. 14, 2017, now abandoned.

(60) Provisional application No. 62/322,352, filed on Apr. 14, 2016.

(56) References Cited

U.S. PATENT DOCUMENTS

| | | |
|---|---|---|
| 10,547,498 B1 * | 1/2020 | Garner, IV ............ H04L 41/065 |
| 2004/0039459 A1 | 2/2004 | Daugherty et al. |
| 2004/0217847 A1 | 11/2004 | Fries et al. |
| 2005/0165906 A1 | 7/2005 | Deo et al. |
| 2008/0120261 A1 | 5/2008 | John et al. |
| 2009/0132698 A1 | 5/2009 | Barnhill |
| 2010/0177749 A1 | 7/2010 | Essinger et al. |
| 2014/0181277 A1 | 6/2014 | Burns et al. |
| 2016/0087698 A1 | 3/2016 | Chang et al. |
| 2016/0142912 A1 | 5/2016 | Pedersen |
| 2016/0337206 A1 | 11/2016 | Bugenhagen et al. |
| 2016/0353305 A1 * | 12/2016 | Zakaria ................. H04W 68/10 |
| 2016/0373310 A1 | 12/2016 | Banikazemi et al. |
| 2017/0171090 A1 * | 6/2017 | Britt ................... H04L 47/2425 |
| 2018/0375720 A1 | 12/2018 | Yang et al. |
| 2020/0204442 A1 | 6/2020 | Qureshi et al. |

* cited by examiner

UNIVERSAL CONFIGURATION, CONTROL AND MONITORING OF DISPARATE DEVICES VIA AN SAAS INTERFACE AND MOBILE APPLICATION

RELATED APPLICATION INFORMATION

This patent is a continuation of U.S. patent application Ser. No. 17/494,674, filed Oct. 5, 2021, which is a continuation-in-part of U.S. patent application Ser. No. 15/488,128 filed Apr. 17, 2017, entitled UNIVERSAL CONTROL AND MONITORING OF SECURITY SYSTEMS AND SECURITY COMPONENTS, which claims priority from the provisional patent application 62/322,352 filed Apr. 14, 2016, all of which are incorporated by reference herein in its entirety.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to residential and commercial premises devices, security systems and components, and connecting, configuring, managing, monitoring and control of those devices, systems and security components.

Description of the Related Art

Residential and commercial security installations involve a wide variety of communication protocols, sensor configurations, controller configurations, and electrical parameters, for example, operating voltages and end of line resistances. Similarly, residential and commercial premises also include multiple control and monitoring devices that involve a wide variety of communication protocols and electrical and other parameters. This results in the existence of multiple specialty products with a lack of universal compatibility. This incompatibility causes challenges for system installers, monitoring companies, hardware manufacturers, and software designers. In practice, security and monitoring professionals use a large variety of disparate products, tools and systems to address the many requirements of their customers. However, integration of the products, tools and systems is made difficult by the incompatibilities described above. There is no system that is simple to install, configure, and use that manages these incompatibilities among premises devices and security products.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

A universal configuration, control and monitoring (UCCM) system that includes a local system including a programmable networked circuit board and local software, a mobile-device application, and a server-based Internet web site accessible via the mobile application and a browser providing a Software as a Service (SaaS) interface is described herein. The local system includes a circuit board that contains a microprocessor, the local software, network communications components and related software all of which enable inputs received from the server software and external components to be sent to the microprocessor, and outputs created from the microprocessor to be sent to the server software and external components. The local and server software included in the UCCM system combine with the mobile application and website interface to enable a user to configure security components and automation software coupled with the local system. This alleviates the time consuming and monetary expense of embedded software development formerly necessitated by incompatible disparate security components, devices and systems. The UCCM system integrates multiple disparate devices and systems from multiple manufacturers with a single, configurable system, namely the UCCM local system. The UCCM system may replace multiple disparate control systems from multiple manufacturers with a single, configurable device that is coupled with and communicates with the multiple disparate systems as well as devices, namely the UCCM local system. The UCCM system as a whole, including the server SaaS portion and the local system in combination, serve as a gateway providing information from, configuration of and communication between multiple disparate devices and components from multiple manufacturers. Since the UCCM local system is programmed via metadata sent by the UCCM server describing state engine configuration and that information only comes from one or more known UCCM servers the UCCM system is more secure than one that accepts arbitrary inbound remote connections and code deployments.

Description of Apparatus

Figure 1:
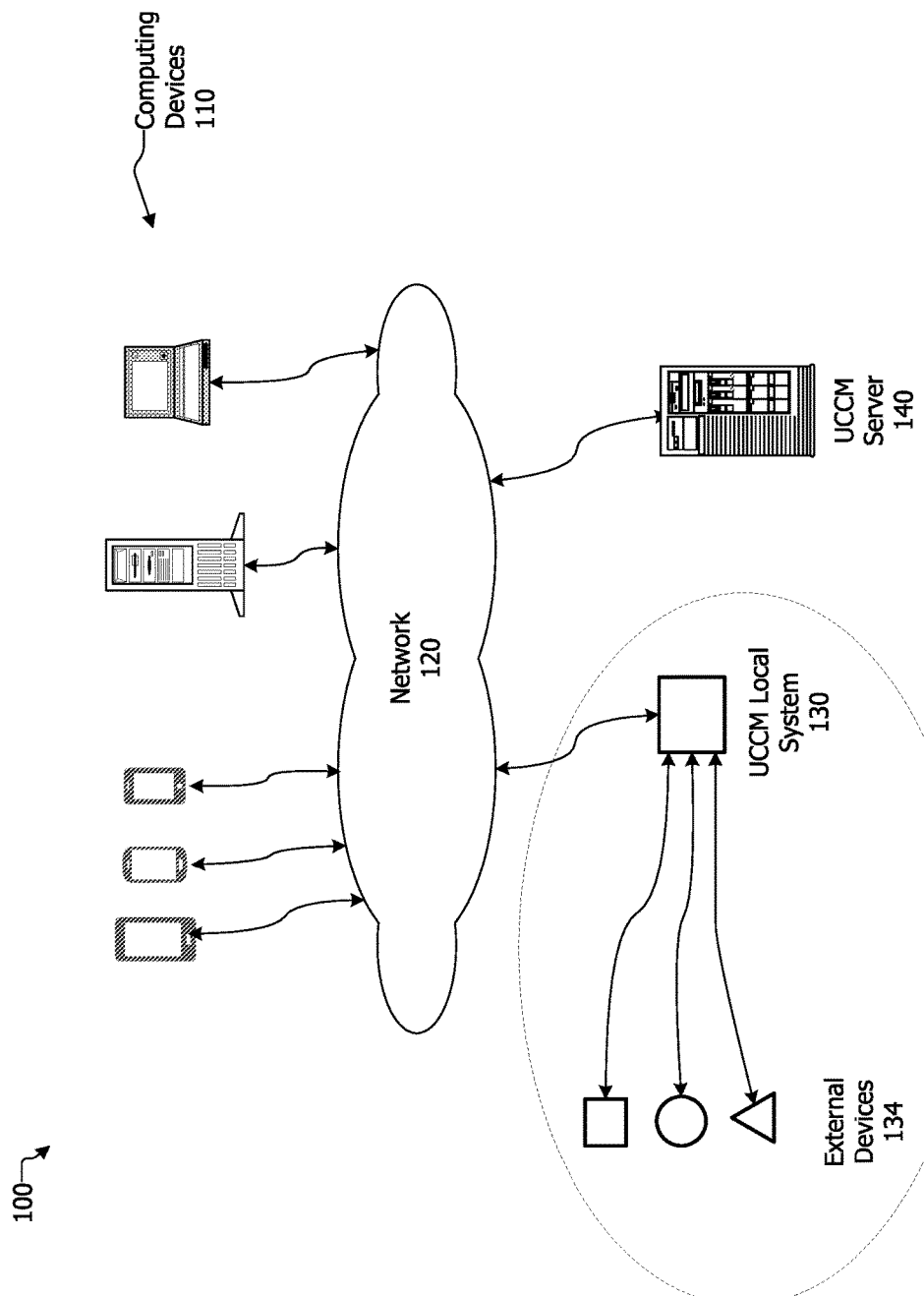
FIG. 1 is a block diagram of an environment in which the universal configuration, control and monitoring system described herein operates.

Referring now to FIG. 1, there is shown a block diagram of an environment 100 in which the UCCM system described herein operates. The UCCM system includes a server 140 running UCCM server software that provides a website offering a Software as a Service (SaaS) interface and mobile application support to users on computing devices 110 over network 120. The UCCM server 140 operates as a management and control portal via a web browser as a Software as a Service (SaaS) interface that allows users of the UCCM system to configure, control, manage and monitor external devices 134 that include premises equipment, networking equipment, safety systems, and security system components and devices and security systems external to a UCCM local system 130. Users of the UCCM system obtain this functionality by accessing the portal on the UCCM server 140 via computing devices 110 using a web interface provided by the UCCM server 140 or by using a UCCM mobile application supported by the UCCM server 140. The UCCM server 140 receives high level commands, configuration and other information provided by users via their computing devices 110 over network 120 via the UCCM portal and sends it to the UCCM local system 130 in a lower level command format unique to the UCCM system. The UCCM local system 130 performs the actual control, monitoring and configuration of the external devices and systems 134. The UCCM local system 130 and external devices and systems 134 may be located in a premises, which include a single room, a single building, multiple rooms, multiple buildings or a campus. The external devices 134 are external to the UCCM local system 130 and are located inside and/or outside the premises. The UCCM local system 130 sends status information of the external devices 134, external device data and other external device information to the UCCM server 140 which provides alerts, security system external device data and other information via the web interface or app interface over network 120 to the users at computing devices 110 who access the UCCM system via a web browser or UCCM mobile application.

A computing device 110 as used herein refers to any device with a processor, memory and a storage device that executes instructions including, but not limited to, personal computers, server computers, computing tablets, smart phones, portable computers, and laptop computers. These computing devices may run an operating system, including, for example, variations of the Linux, Android, Microsoft Windows, Apple iOS and Apple Mac operating systems.

The UCCM server 140, computing devices 110 and UCCM local system 130 communicate through a network 120. The network 120 comprises one or more public and/or private data networks, and other networks and sub-networks, and may include or be the Internet. The network 120 may also include or access cellular telephone and land line telephone networks, VOIP telephone networks, may include satellite links and microwave transmission links, and may be wired and wireless or a combination. The network 120 includes additional devices, not shown, such as routers, switches, firewalls, multiplexors and other networking equipment that enable and enhance network communications. Additional specialized servers such as application servers, database servers, and others may be coupled with or included UCCM system 100 and/or may be accessed by the UCCM server 140 over network 120. Although only UCCM server 140 and one UCCM local system 130 are shown, multiple UCCM servers 140 and multiple UCCM local systems 130 may be included in this environment. In addition, third party central monitoring station servers (not shown) may be coupled with the network 120 so that status information concerning external components and external systems may be communicated to and from the UCCM server 140 and/or the local system 130. Similarly, the UCCM server 140 and/or the local system 130 may communicate UCCM system status as well as external components and external systems status and other information to the third party central monitoring station servers (not shown).

The methods described herein may be implemented on one or more server computers referred to herein as UCCM server 140, one or more UCCM local systems 130 running UCCM local system software, and multiple computing devices 110 accessing the UCCM server 140. The computing devices 110 access the UCCM server 140 via a UCCM mobile application running on mobile computing devices 110 or a web interface provided by UCCM server software running on UCCM server 140 via web browsers included on computing devices 110. A server computer includes software and hardware for providing the functionality and features described herein. A server computer may include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). Certain portion of the methods, functionality and features described herein are embodied in software which operates on a server computer and may be in the form of firmware, an application program, an applet (e.g., a Java applet), a browser plug-in, a COM object, a dynamic linked library (DLL), a script, one or more subroutines, or an operating system component or service.

The UCCM techniques may be implemented in software and stored on a machine readable storage medium in a storage device included with or otherwise coupled or attached to the UCCM server 140, computing devices 110 and UCCM local system 130. That is, the UCCM software is stored on machine readable storage media. These storage media include various kinds of physical media, namely: magnetic media such as hard disk drives (HDDs); optical media such as compact disks (CD-ROM and CD-RW) and digital versatile disks (DVD and DVD±RW); silicon media such as solid-state drives (SSDs) and flash memory cards; and other magnetic, optical or silicon storage media. As used herein, a storage device is a device that allows for reading and/or writing to a storage medium. Storage devices include hard disk drives, DVD drives, SSDs, EEPROMs, flash memory devices, and other magnetic, silicon, optical or other physical media.

Figure 2:
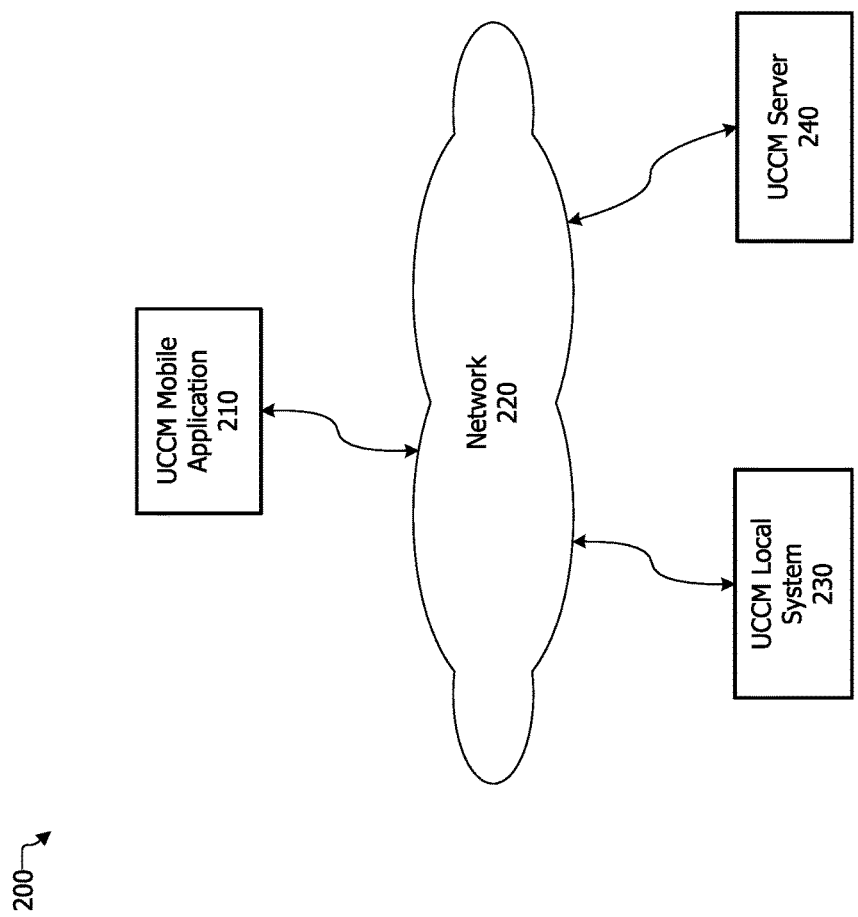
FIG. 2 is a block diagram of a general software configuration of the universal configuration, control and monitoring system described herein.

Referring now to FIG. 2, there is shown a block diagram of a general software configuration of the generalized security system described herein. This discussion also includes reference to FIG. 1 The UCCM includes UCCM server software 240 on a server 140 that includes UCCM website and mobile application support software. The UCCM includes a UCCM mobile application 210 running on mobile computing devices 110. The UCCM 210 mobile application receives configuration, control commands and other information from users and communicates them over network 220 to the UCCM website and app support software of the UCCM server software 240 running on the UCCM server 140. The UCCM server software 240 includes a UCCM local system support software that communicates with UCCM local system software 230 at UCCM local systems 130 over networks 120 and 220. The UCCM server software 240 UCCM local system support software that communicates control, configuration and command information to and receives external device data, alerts and other security device information from UCCM local system software 230.

The UCCM local system 130 takes inventory of all connected external devices 134 and components, and external systems upon startup. The software in the UCCM local system is programmed to recognize and communicate with multiple differing security system components, premises equipment, and devices and systems provided by a multitude of manufacturers. Example components and manufacturers include: alarm panels and key pads from Honeywell International, Inc., NetworX Systems, LLC, DMP—Digital Monitoring Products, Inc. and DSC—Digital Security Controls from Tyco Security Products; access readers that use the Wiegand interface and protocol or Open Supervised Device Protocol (also known as ASDP) such as those from Rosslare Security Products, Inc.; and phones and intercoms from Viking Electronics, Inc.; and others. The UCCM server provides an easy to use graphical interface via a web interface and associated mobile application that provides users the ability to view, monitor, configure and control the external devices, components and systems coupled with the UCCM local system. In this way, users of the UCCM system do not have to have knowledge of the communication requirements and lower level functionality of the external devices, components and systems coupled with the UCCM local system. The external devices components and systems 134 include, for example, door controllers, alarm panels, access systems, keypads, keycard readers, badge readers, man-traps, virtual wires, tamper detectors, panic buttons, biometric devices such as ophthalmic and fingerprint readers, temperature sensors, fire alarms, light sensors, motion sensors, water sensors, humidity sensors, electric strike sensors, window state sensors, audio sensors, microphones, earthquake sensors, accelerometers, door sensors, glass break sensors, video cameras or sensors, and others. The external devices 134 supported by the UCCM system include HVAC systems, digital signage systems, networking equipment such as firewalls, Internet modems, routers and switches, telephone systems, VOIP systems, as well as other premises and computer equipment and systems. The UCCM local system 130 accommodates as external components virtually any sensor that communicates via a voltage, current, resistance, or communication bus messages, video streams, audio streams and data streams.

Figure 3:
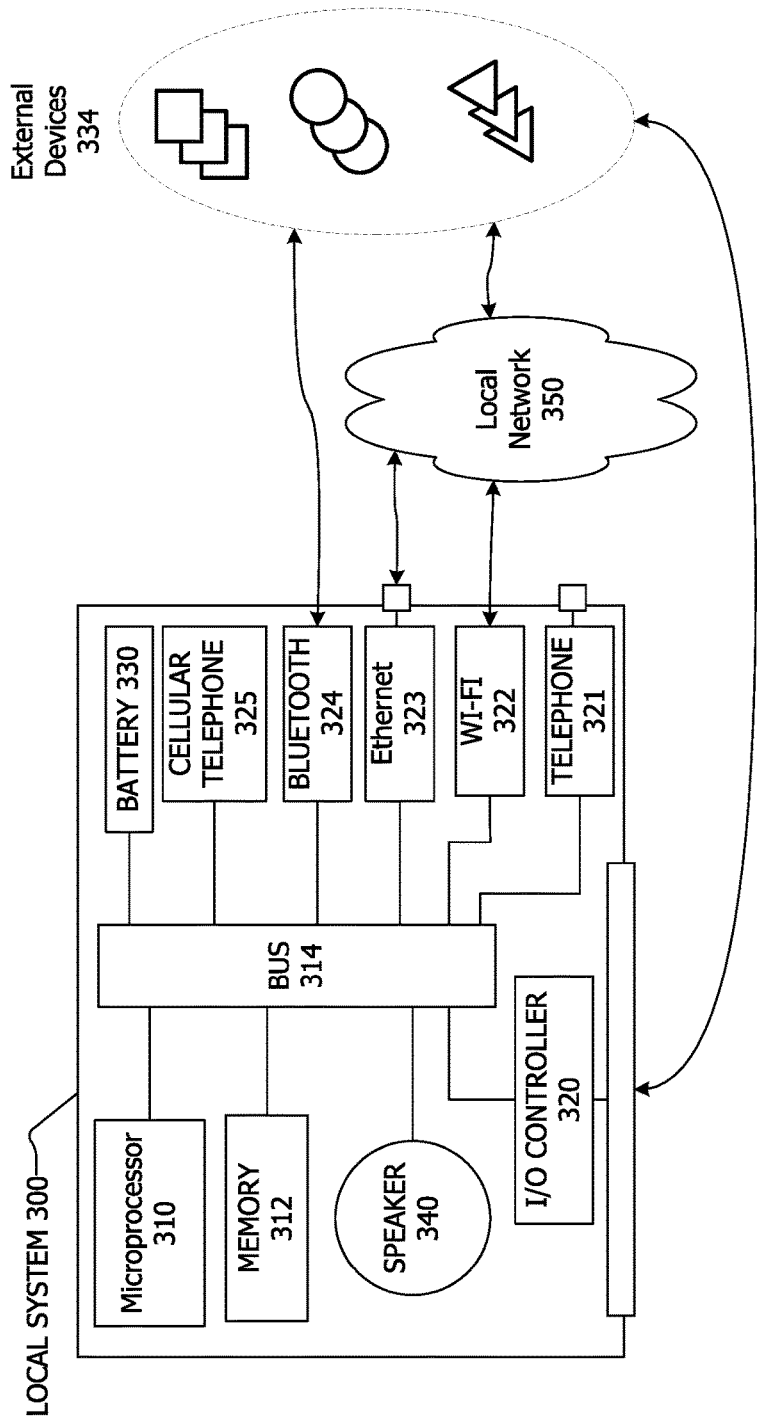
FIG. 3 is a block diagram of an example local system controller board that implements a portion of the universal configuration, control and monitoring system described herein.

Referring now to FIG. 3, there is shown a block diagram of an example UCCM local system 300 that implements a portion of the UCCM system described herein. The UCCM local system 300 may include a single board having multiple components that support the local system portion of the UCCM system. The controller may include multiple boards. The UCCM local system may include multiple boards, and may include multiple groups of boards. The example UCCM local system 300 includes a microprocessor 310 to execute instructions or software stored on a storage device 312 that implements the local system support software of the UCCM system including at least one state machine, one or more of which may include a responder engine. The storage device 312 may be a ROM, EEPROM, flash memory and the like. The UCCM local system 300 includes electronics and software that allows for communicating with the UCCM server and with external devices, components and systems shown and described in FIG. 1 as 134 and shown here as 334. The UCCM local system 300 includes electronics and software in the form a telephone system component 321, a cellular telephone component 325, a WIFI component 322, an Ethernet component 323 and a Bluetooth component 324 that allows for communicating with a UCCM server 140/240 and/or to or with devices and systems through which communications are made with a UCCM server 140/240 over network 120/220 such as, for example, an Internet router, a cell phone, satellite communications, microwave transmissions, and others. Importantly, the UCCM local system 130/230 includes redundant communication systems and related hardware and software the enables the UCCM local system 130/230/300 to communicate systems status information and received management, control and configuration commands during the event of an emergency on any available of the redundant communication systems included in and supported by the UCCM local system 130/230/300. The redundant communication systems include satellite communications, cellular telephone communications, Internet communications, microwave communications, and others. The kind and number of communication components in the UCCM local system is selected by the customer and typically includes at least two forms of communication technology.

The UCCM local system 300 includes electronics and software in the form of an I/O controller 320 (which may be a general purpose input/output controller or GPIO controller), a WI-FI component 322, an ETHERNET component 323 and a BLUETOOTH component 324 that allow for communicating with external devices 334 at the premises where the UCCM local system is installed, including fire alarms, smoke detectors, door sensors, window sensors, motion sensors, earthquake sensors, lightning strike sensors, proximity sensors, security system and monitoring system components, devices and control panels available from multiple manufacturers, as well as video cameras, microphones, audio sensors, humidity sensors, telephone systems, VOIP systems, HVAC systems, digital signage systems, and computer and networking equipment such as firewalls, routers, modems, switches, and other related devices and systems.

The external devices 334 are coupled for communication with the local system 300 by any of multiple wired and wireless communication technologies supported by hardware and software included in the UCCM local system 300. As shown in FIG. 3, the external devices 334 may be coupled directly via Bluetooth component 324 or wired connection via I/O controller 320, or may be coupled wired or wirelessly through a local network (a LAN or local area network) 350 via ethernet component 323 and WI-FI component 322 to UCCM local system 300.

All of the components in the UCCM local system 300 may communicate internally over a single bus 314 or over multiple internal buses or other communication lines. Alerts may be provided via an audio speaker 340 and lights such as LEDs (not shown) on a box or external unit encasing the UCCM local system 300. The UCCM local system 300 has physical connectors that allow for connection to landline telephone, Ethernet cable, and a myriad of devices and control panels.

The example UCCM local system 300 shown in FIG. 3 includes components that may be augmented by or replaced additional and different communications components and other technologies. For example, hardware and software supporting LoRa (Long Range) low-power wide-area network communications, Z-Wave wireless communications, Zigbee, and others may be included.

Description of Processes

Figure 4:
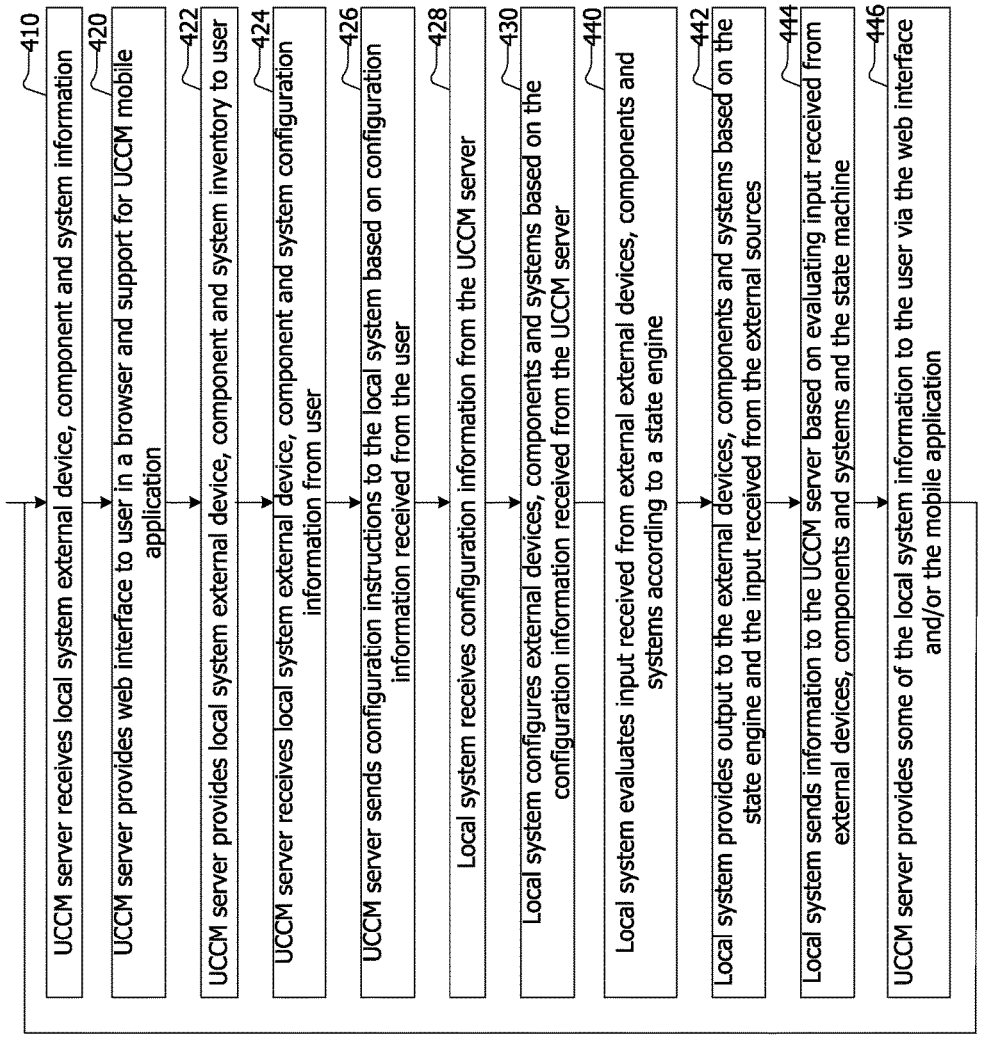
FIG. 4 is a flow chart of actions taken in the universal configuration, control and monitoring system described herein.

Referring now to FIG. 4, there is shown a flow chart of actions taken in the UCCM system described herein. When a UCCM local system 300 is installed, external devices, components and external systems are connected via wired connections and/or wirelessly using the communication components of the local system. The connections may be made (referring to FIG. 3) using BLUETOOTH 324, WI-FI 322, ETHERNET 323, direct wired connection, and others. The UCCM local system 130/300 may initially, upon power on, identify the external sources 134/334 or take an inventory of attached or connected external devices and systems. This may also include communicating with a third party central monitoring station. Certain initial configuration of the local system may be performed on site by a system user. The UCCM local 130 system is typically connected to a network 120 such as the Internet via WI-FI or direct ETHERNET connection, while other connections are possible and encouraged for redundancy in emergency situations. The UCCM local system checks in with and registers with the UCCM server. The UCCM server receives local system external device, component and system information over a network from the UCCM local system, as shown in block 410. The UCCM server provides a web interface to the user in a browser via an SaaS interface portal and support for the UCCM mobile application, as shown in block 420. The UCCM server provides UCCM local system external device, component and system inventory information to a user, as shown in block 422. This is achieved via the UCCM server web interface or the UCCM mobile application. Easy-to-read web pages and mobile application pages allow the user to review the external devices, components and systems connected with the UCCM local system. Through the UCCM SaaS web interface and UCCM mobile application, the user may specify external device, component and system configuration information including, for example, thresholds and parameters such as temperature and humidity, active times, time on, time off, and many others that the UCCM server sends to the UCCM local system. The SaaS web interface and mobile application provide users the ability to specify the configuration and behavior of external devices, components and systems connected with the UCCM local system and the UCCM local system itself which are reflected in the state engines described below. The UCCM server SaaS interface and the UCCM mobile application may provide higher level question/answer wizards to make it relatively easy for users to configure the UCCM local system and the external devices, components and systems attached to the UCCM local system. The UCCM server SaaS interface and the UCCM mobile application may also provide an interface that allows the user to provide lower level configuration settings for the external devices, components and external systems coupled with the UCCM local system. The UCCM server web interface and the UCCM mobile application provide a graphical user interface that allows users to specify configuration information including time-based behavior such as start time or date, end time or date, repeat frequency, interval between events, or hysteresis as well as logical behavior such as "and", "or", or "not". The user specified configuration includes data or configuration information for external devices, components, events created by or through external devices, components, or events created by or through the server. Via the mobile application and/or the SaaS web portal, the UCCM system provides preconfigured lists of information, such as predefined common thresholds, common business hours, users, groups, schedules, and holidays as part of the wizard or other graphical user interface to ease the configuration of the local system and/or the UCCM system as a whole.

The UCCM server receives over the network UCCM local system external device, component and system configuration information from users via the UCCM server web interface and/or the UCCM mobile application, as shown in block 424. The UCCM server sends configuration instructions to the UCCM local system based on configuration information received from the user, as shown in block 426. The UCCM local system receives configuration information from the UCCM server over the network, as shown in block 428. The UCCM local system is programmed via configuration instructions and information in the form of metadata sent by the UCCM server describing state engine configuration and that information only comes from one or more known UCCM servers. This makes the UCCM system secure as the UCCM local system only accepts inbound remote connections and code deployments from known UCCM servers.

The UCCM local system configures external devices, components and systems based on the configuration information received from the UCCM server, as shown in block 430. The UCCM local system sets thresholds, times and other configuration information for connected external devices, components and systems based on the configuration information the user provided. The UCCM local system evaluates input received from external devices, components and systems according to a state engine, as shown in block 440. The input may include a temperature measurement, an analog voltage measurement, a digital voltage measurement, a resistance measurement, position data, motion data, button data, switch data, card reader data, fingerprint data, ophthalmic data, a digital message, results of a ping, Internet connection status, phone system connection status, results of a network scan, results of a component awake or component on query, and others. The UCCM local system provides output to the external devices, components and systems based on the state engine and the input received from the external devices, components and systems, as shown in block 442. This output includes various control information and thresholds such as time and temperature, for example. The UCCM local system receives information from external devices, components and systems. The local system sends information to the UCCM server based in part on evaluating the input received from external devices, components and systems and the state machine, as shown in block 444.

The UCCM server provides some of the local system information to the user via the web interface and/or the mobile application, as shown in block 446, which may include sending text message alerts, central monitoring station messages, email alerts, a SIP communication, a local network message, and other high priority information via one or more user specified communications techniques.

The UCCM server may include an intelligent processing module to evaluate information, status, data, audio and video received from the UCCM local system. In one embodiment, the UCCM server evaluates the messages, audio, video and/or data, referred to herein as information, received from the local system and determines whether they represent an emergency. This determination may be made by examination of the content of a message, evaluating of a bit or other data sent in or with a message, or by the application of a rule, such as evaluating whether a temperature or other metric is outside of an approved or expected range. If the UCCM server determines the message or data represent an emergency, at least one of a central monitoring station and a designated user (or users) are automatically contacted with the pertinent information as set forth in this paragraph. This determination may be made by the UCCM server examining the content of audio and/or video received from the UCCM local system. The intelligent processing module may examine the audio or the audio portion of video for sound fingerprints, sound patterns and audio that represent glass breaking, screaming, and other sounds. When one of these exceptional sounds is identified, the UCCM server automatically notifies at least one of a central monitoring station and/or a designated user (or users) with the pertinent information about a possible emergency. The intelligent processing module may examine the video for visual fingerprints, video patterns and visuals that represent smoke, fire, and other video that identifies an exceptional event. When video analysis reveals an exceptional event, the UCCM server notifies at least one of a central monitoring station and/or a designated user (or users) with the pertinent information about a possible emergency. The automatically notifying and communicating to a central monitoring station and/or designated user (or users) described in this paragraph include the UCCM server sending text message alerts, central monitoring station messages, email alerts, a SIP communication, a local network message, and other high priority information via one or more user specified communications techniques that are supported by the UCCM server.

In addition, the UCCM local system may include an intelligent processing module to evaluate information, status, data, audio and video received from local devices. In one embodiment, the intelligent processing module of the UCCM local system evaluates the messages, audio, video and/or data received from local devices and determines whether they represent an emergency. This determination may be made by examination of the content of a message, evaluating of a bit or other data sent in or with a message, or by the application of a rule, such as evaluating whether a temperature or other metric is outside of an approved or expected range. If the message or data represent an emergency, the UCCM local system automatically notifies at least one of a central monitoring station and a designated with the pertinent information about a possible emergency. This determination may be made by the intelligent processing module of the UCCM local system examining the content of audio and/or video received from local devices. The intelligent processing module of the UCCM local system may examine audio received from a local device or the audio portion of video for sound fingerprints, sound patterns and audio that represent glass breaking, screaming, and other sounds that represent an exceptional event. When one of these exceptional event sounds is identified, the UCCM local system, automatically notifies at least one of a central monitoring station and a designated user with the pertinent information about a possible emergency. The intelligent processing module of the UCCM local system may examine video received from a local device for visual fingerprints, video patterns and visuals that represent smoke, fire, and other video that identifies an exceptional event. When video analysis reveals an exceptional event, the UCCM local system automatically notifies at least one of a central monitoring station and a designated user with the pertinent information about a possible emergency. The automatically notifying and communicating to a central monitoring station and/or designated user (or users) described in this paragraph include the UCCM local system sending text message alerts, central monitoring station messages, email alerts, a SIP communication, a local network message, and other high priority information via one or more user specified communications techniques that are supported by the UCCM local system, examples of which are shown in FIG. 3 as modules supporting cellular telephone 325, ethernet 323 and telephone 321 communications, among others.

The UCCM local system includes software that implements or includes a state machine. In the state machine, a flow is a set of states, containing rules, governed by inputs, and producing outputs. A flow contains a map of states, keyed by the StateID. Each flow may contain an ordered list of rules that are executed from any state. A flow tracks the current state and last state change time and allows for custom storage of key-value pairs for rules to persist data. Multiple flows may be supported. A state is a position in a flow. Each state contains an ordered list of rules that are executed when in that state. A rule is a condition that depends on inputs of the local system and results in a true, false, or indeterminate evaluation. If a rule evaluates to true, associated outputs are communicated and/or the local system current state is changed. A container rule is a special type of rule that contains one or more other rules and bases its condition on the conditions of the contained rules. Container rules may be nested. An input is any aspect of the local system that changes independently and whose properties can be measured, typically signals, data, messages or status the local system receives from connected external components and external systems. Example input includes GPIO pin signals, motion detection signals and status, temperature, time, elapsed time since a particular event or occurrence, and others. An output is any aspect of the local system that can be set or controlled by the local system, typically configuration information and instructions or commands to connected external components and external systems. Output examples include send message to UCCM server, send message to central monitoring station server, send GPIO pin signal, send email, send text message, send SIP communication, send local network message, set local system LED on or off, send command signal to unlock door, send command signal to trigger an audio alarm, send command signal to trigger a visual alarm, and others. An output from the local system may also be an input to an external system, external component or the UCCM server.

Referring to the prior paragraph, example rules include: evaluating if pin is high or a signal code receive, then enter a particular state; evaluating if a temperature is outside of a predefined or user specified range, then issuing a command to turn on a heater and/or sending an alert communication to the UCCM server; evaluating if a time since a last transition then taking a pre-defined or user specified action; evaluating if a signal or pin or combination of signals and pins from one or multiple external components is high while another is also high then taking a predefined or user specified action. The predefined actions may be specified by the manufacturer and provided in the local system. User specified actions may be provided by a user via the web interface or mobile application to the UCCM server which communicates them to the local system.

The state engine is dynamically built at run-time by the local controller in the local system from a configuration file in memory on the circuit board. This configuration file is created from data supplied by the UCCM server based on information specified by a user via the UCCM web interface or the UCCM mobile application. To construct the state engine dynamically, each output class and rule class is associated with a unique identifier. The dynamic configuration file contains for each flow: (1) Each of the states to be created, along with its name and identifier; (2) Each rule to be created, along with its class type, child rules (as needed), associated state, state to transition to if the rule is true (as needed), and a string with its encoded parameters (as needed); (3) Each output to be created, along with its class type, associated rule, and a string with its encoded parameters (as needed); and (4) The initial state of the state engine.

The state engine may include or be augmented by software that referred to as a responder engine. The responder engine responds to signals via a queue, polling, or interrupt process, and includes responder rules, filters, and outputs.

For each signal, responder rules are evaluated. If the signal passes all the filters, then the outputs for that responder rule are executed. The responder engine operates in a repeating loop capturing inputs from external components and external systems and causing the local system to take action in response to those inputs. The responder engine selects actions to take based on parameters set by filters. Inputs to the responder engine include, for example, network communications requests such as TCP/IP or TCP/UDP requests including HTTP POSTS; user inputs, such as user codes entered on a key pad, card reader input, biometric data; device inputs, such as alarm messages from an external system alarm panel; and UCCM server inputs, such as change notifications, requests or information provided by a user via the web portal or mobile application. The responder engine may initiate actions corresponding to the output types listed above, including changing the current state of a flow, changing the mode of an external component or external system, and others. The filters accessed by the responder engine are criteria that limit or specify trigger events. Filter criteria include, for example, the type of input event, value or values of elements contained in the input event data; the rate of occurrence of input events (for example, how often a door opens and closes).

Based on the prior paragraphs, the configuration information obtained by the UCCM server and sent to the UCCM local system includes user specified external devices to be included in the system, user specified external device parameters and thresholds, and state engine specifications, wherein the state engine specifications include flows, states, rules, filters, outputs, and responders.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system comprising a server having instructions stored thereon which when executed cause the server to perform the actions including:
    providing a portal for configuring, managing and controlling a local system and a plurality of external devices coupled with the local system;
    receiving over a network via the portal configuration information for the local system and for the plurality of external devices coupled with the local system from a plurality of users accessing a web interface provided by the portal and a mobile application in communication with the server;
    sending over the network configuration instructions to the local system for configuring local system features, causing the local system to configure the local system features including building a state engine based on the configuration information;
    sending over the network some of the configuration instructions to the local system for configuring the external devices coupled with the local system based on the configuration information received from the user, causing the local system to send configuration information to some of the plurality of external devices coupled with the local system whereby some of the external devices are configured;
    receiving external device information from the local system regarding the external devices coupled with the local system, the external device information sent by the local system resulting from local system evaluation of input received from the external devices according to the state engine in the local system;
    providing over the network at least some of the external device information to the users via the web interface and the mobile application.

2. The system of claim 1 wherein the configuration information includes external device parameters and thresholds.

3. The system of claim 1 wherein the configuration information includes user specified state engine specifications for the state engine included in the local system, wherein the state engine specifications include some selected from flows, states, rules, filters, outputs, and responders.

4. The system of claim 1 wherein the external device information received from external devices includes at least three selected from the group including: a temperature measurement, a humidity measurement, an analog voltage measurement, audio, video, a digital voltage measurement, a resistance measurement, position data, motion data, button data, switch data, a digital message, door status, Internet connection status, lightning strike data, electrical system status, an online/offline status for a particular device.

5. The system of claim 1 wherein the external devices include at least one selected from the group including: LED controller, digital voltage output, analog voltage output, pulse modulated signal output, relay controller, door lock controller, audio sensor, a light sensor, a router, a firewall, a switch.

6. The system of claim 1 wherein the external devices include at least one selected from the group including a door controller, an alarm panel, a keypad, a man-trap, a virtual wire, a tamper detector, a thermostat, a humidity measuring device, an audio sensor, a camera, a video camera, a microphone, a phone system, a VOIP system, a lightning strike detector.

7. The system of claim 1 wherein providing the portal to the user includes providing a configuration wizard that provides the user with pre-defined options and adjustable parameters for the local system and the plurality of external devices.

8. The system of claim 1 further comprising:
evaluating the external device information to determine whether an emergency exists;
when the evaluating determines an emergency exists, automatically providing notification of the emergency to at least one of a central monitoring station and a designated user.

9. The system of claim 8 wherein evaluating whether an emergency exists includes examining content of audio included as the external device information to determine if an exceptional event exists.

10. The system of claim 8 wherein evaluating whether an emergency exists includes examining content of video included as the information to determine if an exceptional event exists.

11. The system of claim 8 wherein evaluating whether an emergency exists includes examining of the content of a message, evaluating a bit or data sent in or with a message do determine if an exceptional event exists.

12. The system of claim 8 wherein evaluating whether an emergency exists includes application of a rule regarding whether a temperature is outside of an expected range.

\* \* \* \* \*